US005542581A

United States Patent [19]

Habora et al.

[11] Patent Number: 5,542,581

[45] Date of Patent: Aug. 6, 1996

[54] DUAL SERVICE SPRAYER

[76] Inventors: Barbara M. Habora, 2025 9th Pl., Vero Beach, Fla. 32960; Rebecca V. Hall, 1901 45th Ave., Vero Beach, Fla. 32966

[21] Appl. No.: 344,846

[22] Filed: Nov. 25, 1994

[51] Int. Cl.$^{6}$ .................................................. G01F 11/06

[52] U.S. Cl. ...................... 222/331; 222/383.1; 222/482; 239/333; 239/436

[58] Field of Search .................................. 222/330, 331, 222/383.1, 481, 481.5, 482, 536; 239/333, 436

[56] References Cited

U.S. PATENT DOCUMENTS

| | | | |
|---|---|---|---|
| 3,749,290 | 7/1973 | Micallef | 222/385 |
| 4,282,991 | 8/1981 | Hazard | 222/536 X |
| 4,614,284 | 9/1986 | Miles | 222/331 |
| 4,618,076 | 10/1986 | Silvenis | 222/331 |
| 4,678,122 | 7/1987 | Riglietti | 222/383.1 X |
| 4,705,191 | 10/1987 | Itzel et al. | 222/80 |
| 4,732,303 | 3/1988 | Wang | 222/536 X |
| 4,925,066 | 5/1990 | Rosenbaum | 222/192 |
| 4,932,563 | 6/1990 | Diamond et al. | 222/129 |
| 5,267,674 | 12/1993 | von Schuckmann | 222/383 |
| 5,301,846 | 4/1994 | Schmitz | 222/481.5 X |

FOREIGN PATENT DOCUMENTS

| | | | |
|---|---|---|---|
| 0347957 | 12/1989 | European Pat. Off. | 222/383.1 |
| 8601438 | 3/1986 | WIPO | 239/436 |

*Primary Examiner*—Joseph A. Kaufman
*Attorney, Agent, or Firm*—Carroll F. Palmer

[57] ABSTRACT

Trigger actuated pump sprayers for application of a great variety of household and industrial liquids are improved for dual service use by inclusion of a spout, which can be operated in a closed mode or an opened mode, mounted to the pump housing and a tubular conduit extending internally of the housing and the cap from the spout to at least the cap for flow of liquid directly from the container on which the sprayer is mounted to the spout whereby liquid may be dispensed from the container through the spout when the user of the sprayer needs larger quantities of the liquid than can conveniently be obtained via the spray pump.

5 Claims, 2 Drawing Sheets

DUAL SERVICE SPRAYER

BACKGROUND OF THE INVENTION

1. Field of the Invention

This application relates to improved pump sprayers for household and industrial liquids. More particularly, it concerns dual service, trigger actuated, pump spray devices that can be attached to conventional screw neck bottles or like containers to dispense the liquid contents either via the pump spray or via a pour spout.

2. Description of the Prior Art

Trigger actuated pump spray dispensers have attained wide spread use for application of a great variety of household and industrial liquids, e.g., detergents, bleaches, insecticides, lubricants, fertilizers, cosmetics, etc., from the bottles or other containers to which such dispensers are attached for handy, immediate use. As a result, many innovations have been made in the construction of the pumps, spray heads and other components used in the construction of such spray devices. The present invention has application generally to all such know and yet to be developed spray devices.

One recognized problem with the trigger actuated pump spray devices has been the limited dosage of liquid that can be dispensed in a given time when large amounts are needed or desired for certain phases of an application process. With application of large quantities of liquid through the spray head, the pump must be repeatedly operated which is time consuming and fatiguing to the user. As a result, modified forms of pump actuated spray devices that can pour liquid from a container in addition to being sprayed via the pump have been developed as disclosed in U.S. Pat. Nos. 4,614,284; 4,618,076; 4,705,191; 4,925,066; 4,932,563 and 5,267,674. The present invention provides a further unique improved form of such dual service sprayer.

OBJECTS

A principal object of the invention is the provision of improved trigger actuated pump spray devices for application of household and industrial liquids.

A further object is the provision of such spray devices that can be attached to conventional screw neck bottles or like containers and are capable of dual service to dispense the liquid contents either via the pump spray or via a pour spout.

Yet another object is the provision of a unique form of dual services sprayer that does not require some associated special construction in the liquid container with which it is associated or attached in order to function.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a improvement in known forms of trigger actuated, pump spray devices that comprise (a) a threaded cap for screw attachment to the threaded neck outlet of a container holding liquid for application by the device, (b) a hand graspable housing supporting an adjustable spray head and connected to the threaded cap, (c) trigger actuated pump means mounted in the housing, and (d) an elongated tube depending from the pump means through the threaded cap to convey the liquid from the container to the pump means for delivery to the spray head.

The improvement of the invention that renders such spray devices capable of dual liquid dispensing service comprises (1) spout means mounted to the housing for dispensing of liquid from the container to which the device is connected through its spout and (2) a tubular conduit extending internally of the housing from the spout means to the cap for flow of liquid directly from the container to the spout means whereby the liquid made be dispensed from the container through the spout means when desired by a user of the device.

In a preferred embodiment, the spout means comprises a pivoted spout which can be moved between a closed mode preventing egress of liquid through the spout and an opened mode permitting dispensing of liquid through the spout.

In another embodiment, the spout means comprises a plug to prevent egress of liquid until removed to permit dispensing of liquid.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
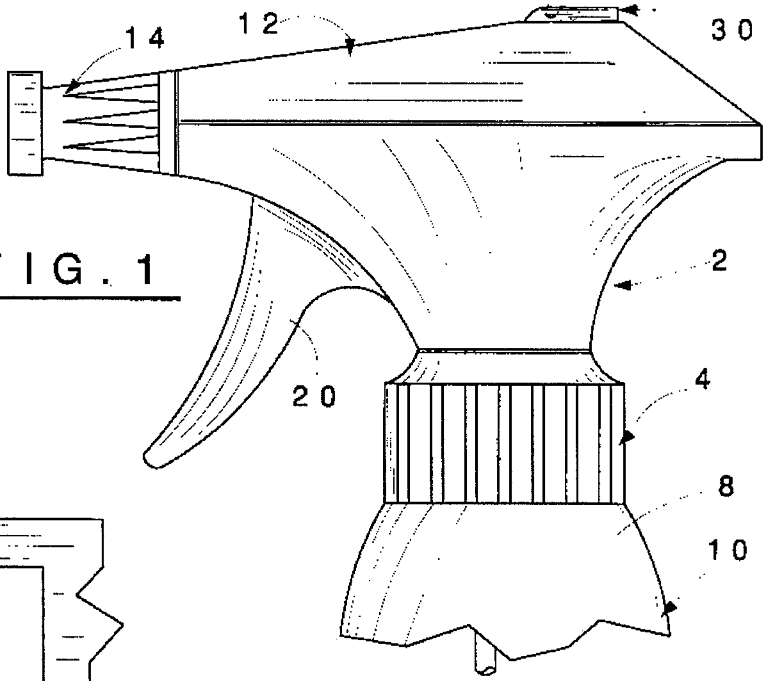
FIG. 1 is fragmentary lateral view of a first embodiment of a dual service spray device constructed in accordance with the invention with the spout means thereof in the closed mode.
Figure 3:
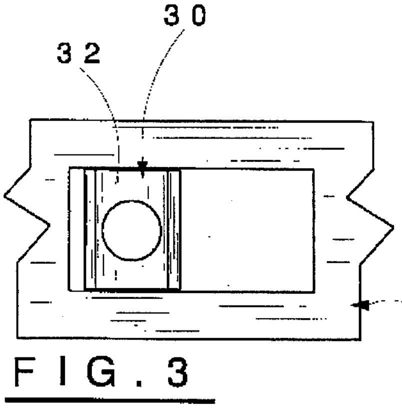
FIG. 3 is an enlarged, fragmentary plan view of the spout portion of the spray device of FIG. 1.

For a detailed description of the invention, reference is made to the drawings in which generic parts of the illustrated matter are indicated by a arrowhead line associated with the designation numeral and specific parts are indicated with plain lines associated with the numerals.

The pump spray device 2 of the invention comprises a cap 4 defining a chamber 5 containing internal threads 6 for screw attachment to the threaded neck outlet 8 of bottle 10 holding liquid (not shown), a hand graspable housing 12 supporting an adjustable spray head 14 connected to the threaded cap 4 at a junction 16, pump means 18 including an actuation trigger 20 mounted in the housing 12, and elongated tube 22 depending from the pump means 18 through the threaded cap 4 to convey the liquid from the container 10 to the pump means 18 for delivery to the spray head 14 via conduit 24 and valve means including check valve 26.

The components of the device 2 as delineated above are conventional in the art and may come in a variety of configurations. For example, the pump means may be positioned as illustrated in the drawings or at other angles not illustrated and be supported by various types of webs or trusses (not shown). The improvements of the invention are contemplated for use with all such conventional spray devices or modifications thereof to accommodate the invention improvements.

Figure 2:
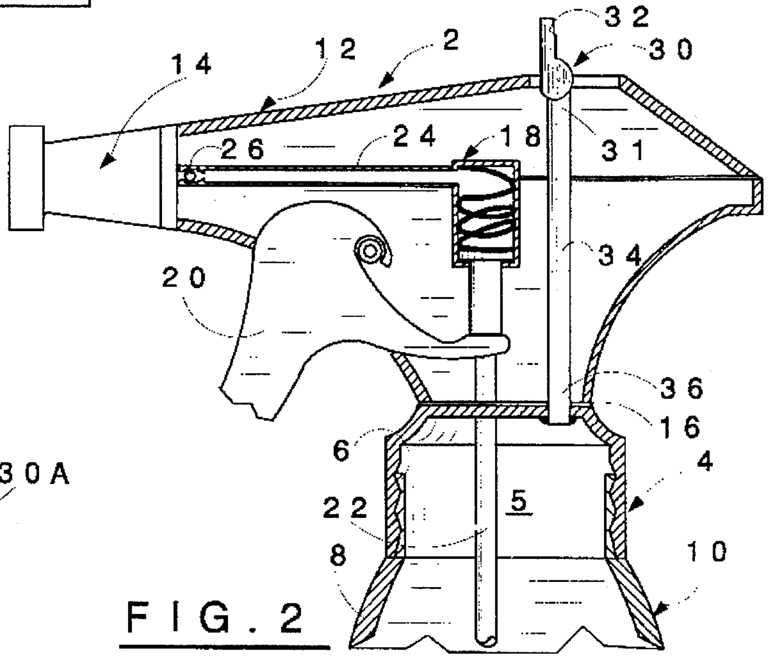
FIG. 2 is a fragmentary, partially sectionalized, lateral view of the dual service spray device of FIG. 1 with the spout means thereof in the opened mode.

The improvement that renders the spray devices of the invention capable of dual liquid dispensing service comprises spout means 30 mounted to the housing 12 including a pivoted spout 32 which can be moved between a closed mode as shown in FIG. 1 that prevents egress of liquid and an opened mode as shown in FIG. 2 that permits dispensing of liquid.

A tube 34 extends internally of the housing 12 from the spout means 30 at its upper end 31 to the cap 4 for flow of liquid directly from the container 10 to the spout 32 whereby the liquid may be dispensed from the container 10 through the spout 32 when desired by a user of the device 2.

The inlet end 36 of tube 34 may terminate at the junction of tube 34 with cap 4 or may extend beyond such junction as indicated by phantom lines in FIG. 2.

Figure 4:
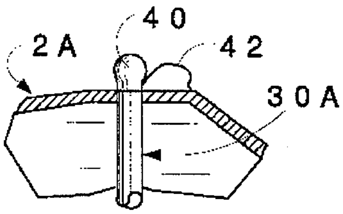
FIG. 4 is an enlarged, fragmentary lateral view of the spout portion of another embodiment of the spray device of the invention.

In the second embodiment of the invention as shown in FIG. 4, the spout means 30A of the device 2A comprises a plug (stopper) 40 to provide a closed mode to prevent egress of liquid until removed (not shown) to provide an opened mode to permit dispensing of liquid. The plug 40 may be secured to the device 2A by a lanyard 42.

Figure 5:
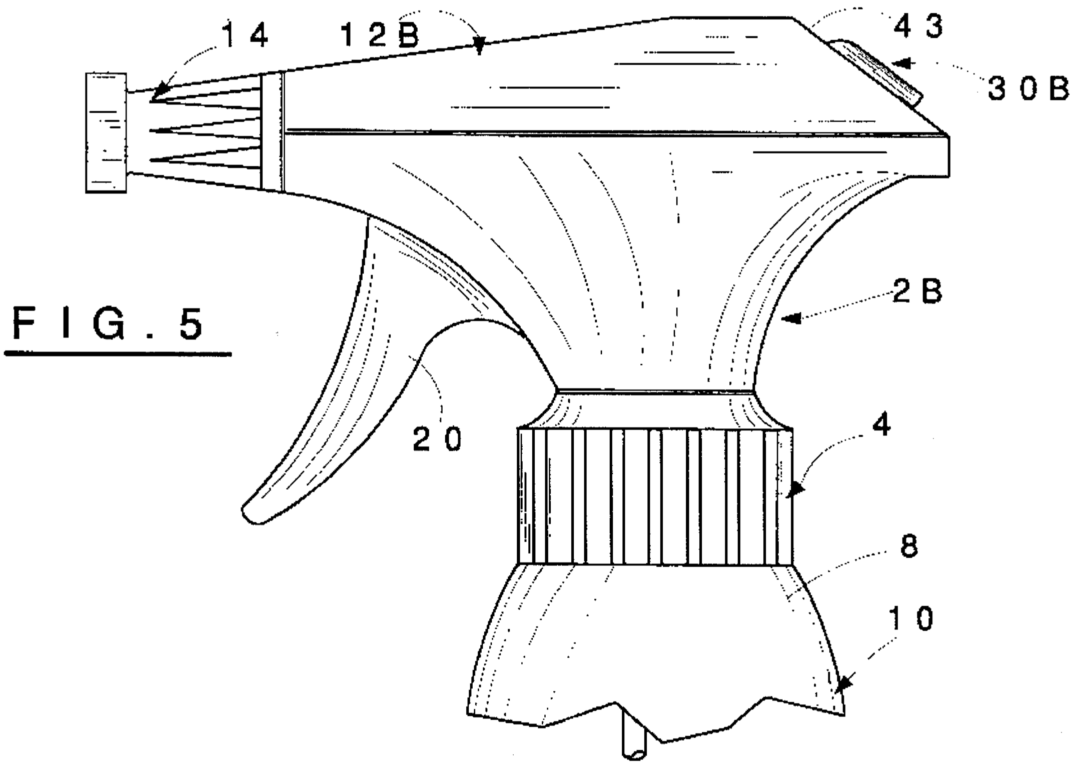
FIG. 5 is fragmentary lateral view of a further embodiment of a dual service spray device constructed in accordance with the invention with the spout means thereof in the closed mode.
Figure 6:
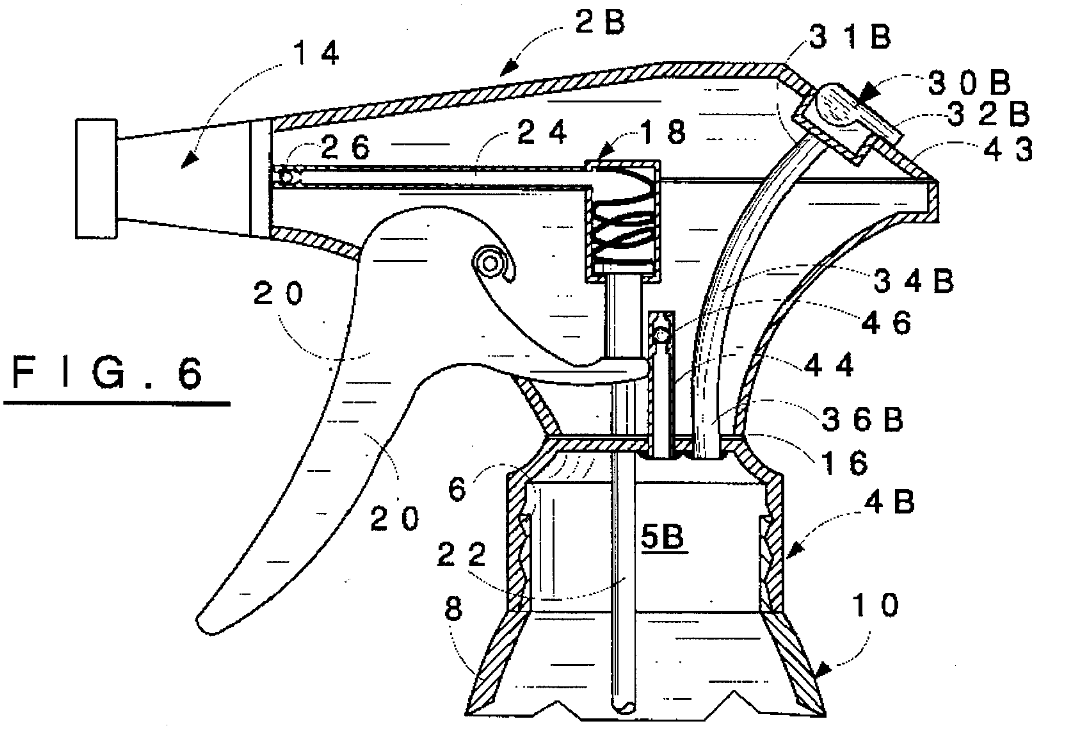
FIG. 6 is a partially sectionalized, lateral view of the dual service spray device of FIG. 5.

In the third embodiment of the invention as shown in FIGS. 5 & 6, the device 2B is generally similar to device 2, but the spout means 30B comprises a pivote spout 32B mounted to the slanted, rear portion 43 of the housing 12B. A tube 34B extends internally of the housing 12B from the spout means 30B at its upper end 31B to the cap 4B at its lower end 36B for flow of liquid directly from the container 10 to the spout 32B.

In order to prevent vacuumizing of the container 10 when liquid is dispensed through the spray head 14 or the spout 32B, the internal chamber 5B of the cap 4B is ported to ambient via a tube 44 provided at its free end with a check valve 46 to permit air from the ambient to enter the chamber 5B, but prevent liquid from flowing out of the container 10 through the tube 44.

In use of the new dual service sprayers 2, 2A or 2B of the invention, liquid from the container 10 will most often be dispensed by manipulation of the trigger 20 to spray a mist or stream, depending on the setting of the spray head 14, onto a surface (not shown) to which the liquid needs to be applied. However, in the event that larger amounts of the liquid must be applied in a brief period of time, the spout means 30, 30A or 30B will be placed in the opened mode (see FIG. 1) and the sprayer 2, 2A or 2B and container 10 will be inverted to permit liquid in the container 10 to flow through the tube 34 and flow out the spout means 30, 30A or 30B for use as required.

The embodiments of the invention in which an exclusive property or privilege is claimed are defined as follows:

1. In a trigger actuated, pump spray device including a threaded cap for screw attachment to the threaded outlet of a container holding liquid for application by said device, a housing supporting a spray head and connected to said threaded cap, pump means including an actuation trigger mounted in said housing, and an elongated conduit means depending from said pump means through said threaded cap to convey said liquid from said container to said pump means for delivery to said spray head, the improvement that renders said spray device capable of dual liquid dispensing service which comprises:

spout means mounted to said housing through which said liquid is dispensed and a tubular conduit extending internally of said housing communicating said spout means with said threaded cap for flow of liquid from said container to said spout means along a path internally of said threaded cap whereby said liquid is dispensed from said container through said spout means.

2. The spray device of claim 1 wherein said spout means comprises a pivoted spout which can be moved between a closed mode preventing egress of liquid through said spout and an opened mode permitting dispensing of liquid through said spout.

3. The spray device of claim 1 wherein said spout means comprises a plug to prevent egress of liquid until removed to permit dispensing of liquid.

4. In a trigger actuated, pump spray device including a threaded cap defining an internal chamber for screw attachment to the threaded neck outlet of a bottle holding liquid for application by said device, a hand graspable housing supporting an adjustable spray head and connected to said threaded cap, pump means including an actuation trigger mounted in said housing, and an elongated tube depending from said pump means through said threaded cap to convey said liquid from said container to said pump means for delivery to said spray head, the improvement that renders said spray device capable of dual liquid dispensing service which comprises:

spout means mounted to said housing comprising a pivoted spout which can be moved between a closed mode preventing egress of liquid through said spout and an opened mode permitting dispensing of liquid through said spout and a tubular conduit extending internally of said housing and said threaded cap from said spout means to said internal chamber for flow of liquid directly from said container to said spout means whereby said liquid is dispensed from said container through said spout means when desired by a user of said device.

5. In a trigger actuated, pump spray device including a threaded cap defining an internal chamber for screw attachment to the threaded neck outlet of a bottle holding liquid for application by said device, a hand graspable housing supporting an adjustable spray head and connected to said threaded cap, pump means including an actuation trigger mounted in said housing, and an elongated tube depending from said pump means through said threaded cap to convey said liquid from said container to said pump means for delivery to said spray head, the improvement that renders said spray device capable of dual liquid dispensing service which comprises:

spout means mounted to said housing comprising a pivoted spout which can be moved between a closed mode preventing egress of liquid through said spout and an opened mode permitting dispensing of liquid through said spout, a tubular conduit extending internally of said housing and said threaded cap from said spout means to said internal chamber for flow of liquid directly from said container to said spout means whereby said liquid is dispensed from said container through said spout means when desired by a user of said device and valve means connecting said internal chamber to ambient for fluid flow only from ambient into said chamber.

* * * * *